(12) United States Patent
Wallace et al.

(10) Patent No.: US 11,086,355 B2
(45) Date of Patent: Aug. 10, 2021

(54) ELECTRONIC DEVICE WITH COLLAPSING INTERFACE COMPONENTS

(71) Applicant: Lenovo (Singapore) Pte. Ltd., New Tech Park (SG)

(72) Inventors: Brian William Wallace, Wake Forest, NC (US); Ali Kathryn Ent, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 441 days.

(21) Appl. No.: 15/339,040

(22) Filed: Oct. 31, 2016

(65) Prior Publication Data

US 2018/0120894 A1    May 3, 2018

(51) Int. Cl.
*G06F 1/16* (2006.01)
*G06F 13/40* (2006.01)
*G06F 13/42* (2006.01)
*G06F 1/20* (2006.01)

(52) U.S. Cl.
CPC .......... *G06F 1/1616* (2013.01); *G06F 1/1624* (2013.01); *G06F 1/1656* (2013.01); *G06F 1/203* (2013.01); *G06F 13/4068* (2013.01); *G06F 13/4282* (2013.01); *G06F 2213/0042* (2013.01)

(58) Field of Classification Search
CPC ...... G06F 1/1616; G06F 1/1656; G06F 1/203; G06F 13/4282; G06F 13/4068; G06F 1/1637; G06F 2213/0042
See application file for complete search history.

(56) References Cited

U.S. PATENT DOCUMENTS

| 5,635,928 | A | * | 6/1997 | Takagi | G06F 1/1616 341/22 |
| 5,738,536 | A | * | 4/1998 | Ohgami | G06F 1/1616 361/679.4 |
| 5,742,475 | A | * | 4/1998 | Riddiford | G06F 1/1616 16/291 |
| 5,754,395 | A | * | 5/1998 | Hsu | G06F 1/1616 361/679.11 |
| 6,002,581 | A | * | 12/1999 | Lindsey | G06F 1/1616 312/223.2 |
| 6,028,768 | A | * | 2/2000 | Cipolla | G06F 1/1616 361/679.12 |

(Continued)

*Primary Examiner* — Jinhee J Lee
*Assistant Examiner* — Theron S Milliser
(74) *Attorney, Agent, or Firm* — The Small Patent Law Group LLC; Dean D. Small

(57) ABSTRACT

An electronic device is provided that includes a display unit, a memory storing program instructions, a processor to execute the program instructions in connection with operating the electronic device, and a main body unit housing the memory and processor. The display unit is rotatably mounted to the main body unit. The main body unit has a sidewall divided into first and second sidewall segments that are moved relative to one another corresponding to the main body unit being shifted between active and storage states. An interface component is mounted within the sidewall of the main body unit. The interface component includes members spaced apart from one another by gaps. The members are moved relative to one another between an operative position corresponding to the main body unit in the active state and a collapsed position corresponding to the main body unit in the storage state.

19 Claims, 9 Drawing Sheets

(56) References Cited

U.S. PATENT DOCUMENTS

| | | | | |
|---|---|---|---|---|
| 6,078,495 A * | 6/2000 | Cipolla | G06F 1/203 | 361/679.46 |
| 6,175,492 B1 * | 1/2001 | Nobuchi | G06F 1/1616 | 361/679.08 |
| 6,181,554 B1 * | 1/2001 | Cipolla | G06F 1/1616 | 361/679.02 |
| 6,459,573 B1 * | 10/2002 | DiStefano | G06F 1/203 | 361/679.46 |
| 6,496,369 B2 * | 12/2002 | Nakamura | G06F 1/1616 | 165/80.3 |
| 6,556,430 B2 * | 4/2003 | Kuo | G06F 1/1616 | 16/285 |
| 6,700,773 B1 * | 3/2004 | Adriaansen | G06F 1/1618 | 345/156 |
| 6,816,365 B2 * | 11/2004 | Hill | G06F 1/1616 | 341/22 |
| 6,870,730 B2 * | 3/2005 | Riddiford | G06F 1/1616 | 248/917 |
| 7,075,781 B2 * | 7/2006 | Peng | G06F 1/1616 | 361/679.55 |
| 7,894,184 B2 * | 2/2011 | Huang | G06F 1/1616 | 361/679.11 |
| 8,183,459 B2 * | 5/2012 | Wei | G06F 1/1624 | 174/50 |
| 8,391,000 B2 * | 3/2013 | Saito | G06F 1/1616 | 361/679.01 |
| 8,922,989 B2 * | 12/2014 | Senatori | G06F 1/16 | 235/462.45 |
| 9,100,470 B2 * | 8/2015 | Walker | G06F 1/1616 | |
| 9,213,372 B2 * | 12/2015 | Krumpelman | H01H 13/14 | |
| 9,632,530 B2 * | 4/2017 | Jacobs | G06F 1/1662 | |
| 9,823,717 B2 * | 11/2017 | Lin | G06F 1/203 | |
| 2004/0212958 A1 * | 10/2004 | Jones | G06F 1/1616 | 361/679.27 |
| 2008/0050953 A1 * | 2/2008 | Reid | G06F 1/1616 | 439/131 |
| 2008/0055843 A1 * | 3/2008 | Ke | G06F 1/1616 | 361/679.43 |
| 2011/0013372 A1 * | 1/2011 | Kang | G06F 1/1656 | 361/752 |
| 2012/0156907 A1 * | 6/2012 | Ladouceur | H01R 13/639 | 439/131 |
| 2013/0130524 A1 * | 5/2013 | Wang | G06F 1/1656 | 439/142 |
| 2013/0163201 A1 * | 6/2013 | Wang | H05K 5/0213 | 361/692 |
| 2013/0201617 A1 * | 8/2013 | Tsai | G06F 1/1616 | 361/679.4 |
| 2014/0168875 A1 * | 6/2014 | Nakamura | G06F 1/1666 | 361/679.09 |
| 2014/0183019 A1 * | 7/2014 | Misawa | G06F 1/1616 | 200/5 A |

* cited by examiner

ELECTRONIC DEVICE WITH COLLAPSING INTERFACE COMPONENTS

FIELD

Embodiments of the subject matter described herein relate to electronic devices that collapse in a storage position and methods of providing the same.

BACKGROUND

An electronic device, such as a laptop, personal computer (PC), typically combines the components, inputs, outputs, the display unit, speakers, keyboard, and the like into a single unit. Laptop computers are fully functional in that the laptop may execute the very same programs, for example word processors and spreadsheet programs, as full sized or desktop computers. Laptop computers have a battery that allows for remote operation of the laptop even in locations where alternating current (AC) wall socket power is not available.

Other advantages of such an electronic device include a small size or footprint and portability. For a user who travels frequently and needs computing power in those travels, a portable or laptop computer is desirable. Even with the small size of the laptop, the laptop still has considerable space or room inside the main body unit. Reducing the space inside the main body unit and hence, the size of the electronic device is desirable for storing or ease of carrying and transporting the electronic device.

BRIEF DESCRIPTION

In accordance with embodiments herein, an electronic device is provided. The device comprises a display unit, a memory storing program instructions and a processor to execute the program instructions in connection with operating the electronic device. A main body unit houses the memory and processor. The display unit is rotatably mounted to the main body unit. The main body unit has a sidewall divided into first and second sidewall segments that are moved relative to one another in connection with the main body unit being shifted between active and storage states. An interface component is mounted within the sidewall of the main body unit. The interface component includes members spaced apart from one another by gaps. The members are moved relative to one another between an operative position and a collapsed position. The operative position corresponds to the active state. The collapsed position corresponds to the storage state.

Optionally, the interface component may represent an electrical connector that may be divided into first and second shells that mate with one another. The members on the first shell may align with corresponding members on the second shell when in the operative position. The members on the first shell may be offset to fit between the members on the second shell when in the collapsed position. The members may be movable relative to one another between aligned and interleaved arrangements. The interface component may have a first height corresponding to the operative position. The interface component may have a second height corresponding the collapsed position. The second height may be less than the first height. The interface component may represent a ventilation component and the members may represent fins within the ventilation component.

Optionally, the fins may be spaced apart by the gaps at a first orientation in connection with the operative position. The fins may collapse into the gaps in a second orientation in connection with the collapsed position. The fins may rotate between the first and second orientations. The sidewall may be movable between first and second heights in connection with the main body unit being movable between the active and storage states. The interface component may represent an electrical connector divided into first and second shells that may be pivotally connected to each other and surround a gap. The members on the first shell may align with corresponding members on the second shell in a first orientation in connection with the operative position. The first and second shells may collapse into the gap in a second orientation in connection with the collapsed position. The first and second shells may pivot between the first and second orientations. The interface component may have a predetermined standard form factor envelop in the operative position.

In accordance with embodiments herein, an electronic device is provided. The device comprises a display unit and a main body unit. The display unit is rotatably mounted to the main body unit. The main body unit has a sidewall divided into first and second sidewall segments that are movable relative to one another corresponding to the main body unit being movable between active and storage states. An interface component is mounted within the sidewall of the main body unit. The segments move relative to one another such that the sidewall shifts between first and second heights corresponding to the main body unit being movable between the active and storage states.

Optionally, the first sidewall segment may be nested inside the second sidewall segment when the main body unit is in the storage state. The interface component may represent a HDMI connector divided into first and second shells that mate with one another. The first and second shells may include members. The members on the first shell may align with corresponding members on the second shell in an operative position corresponding to the main body unit being in the active state. The members on the first shell may be offset to fit between the members on the second shell in a collapsed position corresponding to the main body unit being in the storage state.

Optionally, the interface component may represent a ventilation component. The ventilation component may include fins. The fins may be spaced apart by gaps in a first orientation in connection with the main body unit being in the active state. The fins may collapse into the gaps in a second orientation in connection with the main body unit being in the storage state. The fins may rotate between the first and second orientations. The interface component may represent a USB connector divided into first and second shells that are pivotally connected to each other and surround a gap. The members on the first shell may align with corresponding members on the second shell in a first orientation corresponding to the USB connector being in the active state. The first and second shells may collapse into the gap in a second orientation corresponding to the USB connector being in the storage state.

In accordance with embodiments herein, a method is provided. The method provides an electronic device with a display unit rotatably mounted to a main body unit, positions the display unit and the main body unit in an operative, wherein the display unit is rotatable toward the main body unit to a storage position of the electronic device and enabling a first segment of a sidewall of the main body unit to move relative to a second segment of the sidewall of the main body unit to reduce the height of the main body unit.

Optionally, the method may move spaced apart members of an interface component mounted within the sidewall relative to one another to allow the first and second segments of the sidewall of the main body unit to move relative to each other to reduce the height of the main body unit. The method may include enabling the first segment to be movable, relative to the second segment, to a position inside of the second segment. The method may further provide an interface component in the sidewall. The interface component may represent an electrical connector divided into first and second shells that are pivotally connected to each other and surround a gap. Positioning the display unit and the main body unit in an operative position may include aligning members on the first shell with corresponding members on the second shell. Moving the first segment relative to the second segment may include pivoting the first shell relative to the second shell such that the first and second shells collapse into the gap to reduce the height of the main body unit.

Optionally, the method may provide an interface component in the sidewall. The interface component may represent a connector divided into first and second shells that mate with one another and surround a gap. Positioning the display unit and the main body unit in an operative position for use may include aligning members on the first shell with corresponding members on the second shell. Moving the first segment relative to the second segment may include moving the first shell to an offset position relative to the second shell such that the a member of the first shell fits into the gap to reduce the height of the main body unit.

BRIEF DESCRIPTION OF THE DRAWINGS

The subject matter described herein will be better understood from reading the following description of non-limiting embodiments, with reference to the attached drawings, wherein below.

DETAILED DESCRIPTION

It will be readily understood that the components of the embodiments as generally described and illustrated in the FIGS. herein, may be arranged and designed in a wide variety of different configurations in addition to the described example embodiments. Thus, the following more detailed description of the example embodiments, as represented in the FIGS., is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1A:
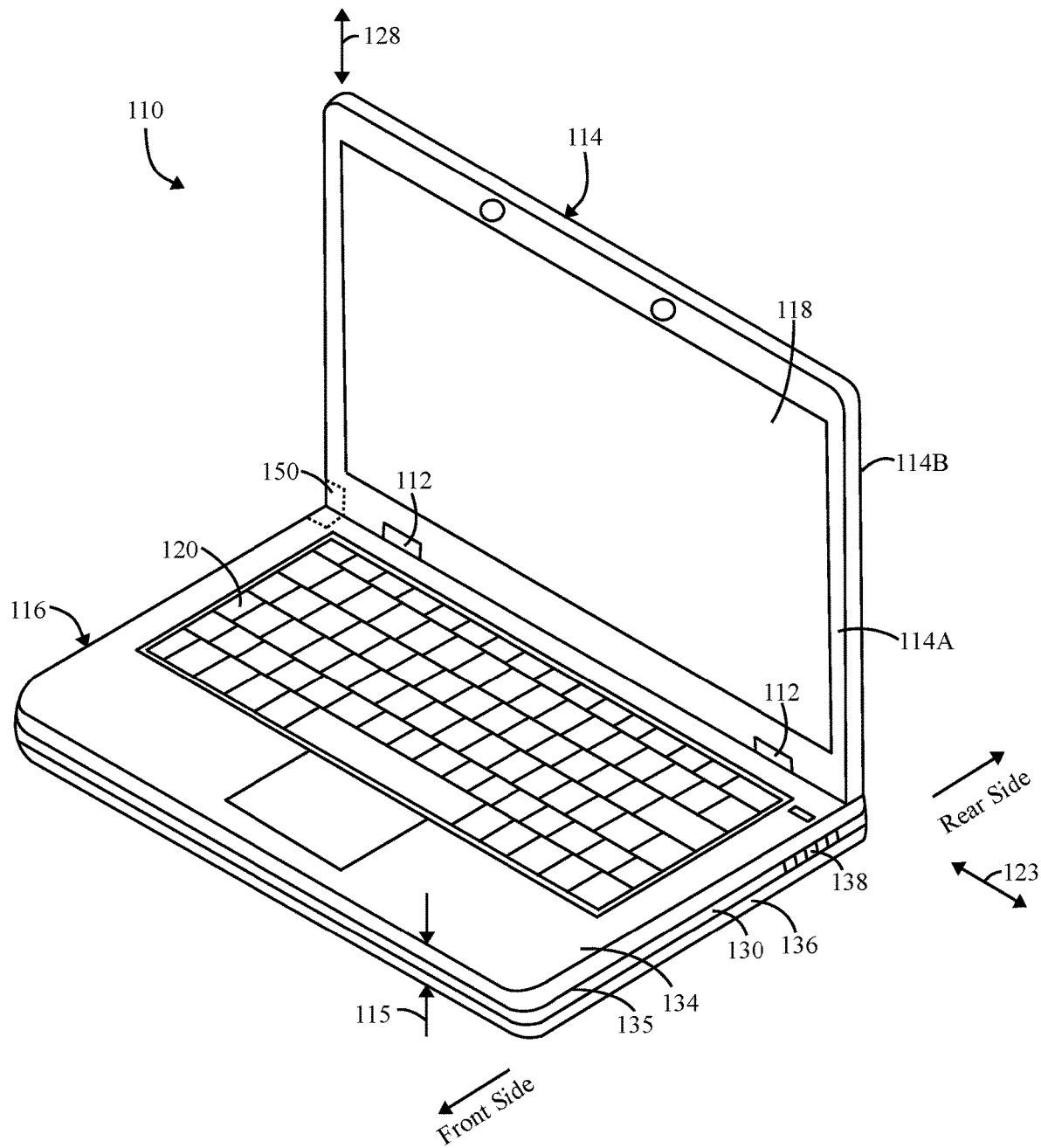
FIG. 1A illustrates a perspective view of an electronic device in the operative position according to various embodiments.

Throughout the present description, the terms "vertical" and "lateral" shall define directions with respect to the display and keyboard of the device. The term "lateral" shall refer to a direction extending transversely across the user input region (e.g., from left to right or from right to left, with respect to a keyboard). In the example of FIG. 1A, the lateral direction is illustrated by lateral axis 123 which extends through the hinges. The term "vertical" shall refer to a direction extending outward from the user input (e.g., keyboard) such as in a direction non-parallel to the lateral direction. In the example of FIG. 1A, the vertical direction illustrated by the vertical axis 128 is oriented perpendicular to the lateral axis 123, with the vertical axis extending upward along the display unit 114.

Throughout the present description, the terms "upper", "lower", "top", "bottom", "left", "right", "front", "forward", "rear", and "rearward" shall define directions or orientations with respect to the main body unit as illustrated in FIG. 1A. The front side of the main body unit is depicted by the arrow that is labeled "front side" in FIG. 1A. The rear side of the main body unit is depicted by the arrow that is labeled "rear side" in FIG. 1A. Forward and rearward corresponds to the direction toward and away from a user, respectively, when positioned in front of the keyboard and viewing the display during normal operation. It will be understood that the spatially relative terms "upper", "lower", "top", "bottom", "left", "right", "front", "forward", "rear", and "rearward" are intended to encompass different orientations of the electronic device in use or operation in addition to the orientation depicted in the FIGS. For example, if the electronic device in the FIGS. is turned over, elements described as "upper" elements or features would then be "lower" elements or features.

Throughout the present description, the term "longitudinal" shall define directions with respect to the keyboard of the device. The term "longitudinal" shall refer to a direction extending perpendicular to the lateral axis 123 and extending between the front and rear of the main base unit. The longitudinal direction is illustrated by longitudinal axis 125 in FIG. 1B.

FIG. 1A is a perspective view of an electronic device 110 formed according to one embodiment herein, showing a state where a display unit 114 is opened from a main body unit 116 by hinges 112 so that both will be essentially perpendicular to each other. The display unit 114 is attached to the main body unit 116 so as to be freely opened and closed. The electronic device 110 can be suitably used as a laptop PC when the display unit 114 is angled relative to the main body unit 116. Note that, in addition to such a convertible PC, the embodiments herein can be suitably applied to electronic devices such as cellular phones, smart phones, and various electronic organizers.

The main body unit 116 houses a keyboard 120, processor, memory as well as other components based on the nature and functionality to be provided. For descriptive convenience, it is assumed that the display unit 114 is completely closed to the main body unit 116 at a 0-degree angle position between the main body unit 116 and the display unit 114 by hinges 112, where the display 118 and the keyboard 120 face each other. In relation to a user who looks directly at the front face of the display unit 114, the side closest to the user is called the front side 114A (forward) and the side furthest away from the user is called the rear side 114B (rearward). The thickness 115 of the main body unit 116 will be referred to as the vertical direction and the width will be referred to as the lateral direction.

The display unit 114 contains the display 118 and the main body unit 116 containing the keyboard 120. The display 118 represents a flexible display layer such as an organic light-emitting diodes (OLED) display. The display unit 114 unit displays characters and graphics for viewing. The display unit 114 and the main body unit 116 are constantly connected and rotated, from the 0-degree position to any other angular position, by the hinge 112. The hinge enables the display unit 114 to rotate from zero to three hundred sixty degrees relative to the main body unit 116. The display unit 114 is electrically connected to the main body unit 116 by a cable, not shown, through the hinge 112. Optionally, the hinge 112 may be formed from a section of the flexible display layer alone or in combination with other structures. The main body unit 116 is configured such that the hinge 112 is located at the rear edge portion of the main body unit 116. Other ways to rotatably mount the display unit 114 to the main body unit 116 may be used instead of the hinge 112. The main body unit 116 includes upper and lower housings 134 and 136 that together are formed into the shape of a flat box and contain various electronic components, not shown, such as a substrate, an arithmetic unit, a processor and a memory that are housed therein.

The display unit 114 is rotated relative to the main body unit 116 through the hinge (112 in FIG. 1A) to an open position. When in the open position, the front surface 114A of the display unit 114 faces in the direction of the keyboard 120 and is visible to the user of the keyboard.

The electronic device 110 may be in an operative position for use when the display unit 114 is in an open position angled at a position approximately ninety degrees or beyond relative to the main body unit (FIG. 1A). The electronic device 110 is in a storage position when the display unit 114 and the main body unit 116 face each other at an angle of zero degrees relative to each other in a closed position of the display unit 114. The main body unit 116 includes an upstanding sidewall 130. The sidewall 130 is defined by the upper and lower housings 134, 136. The keyboard 120 is mounted within the upper housing 134. The sidewall 130 extends around the periphery of the main body unit 116. The upper and lower housings 134, 136 are stacked along an interface 135. A reference plane extends along the interface 135. The upper and lower housings 134, 136 are nested in one another when collapsed (FIG. 1C) for storage. The upper and lower housings 134, 136 are separated in a stacked un-nested relation when in the active state of operative position (FIG. 1B).

Figure 1B:
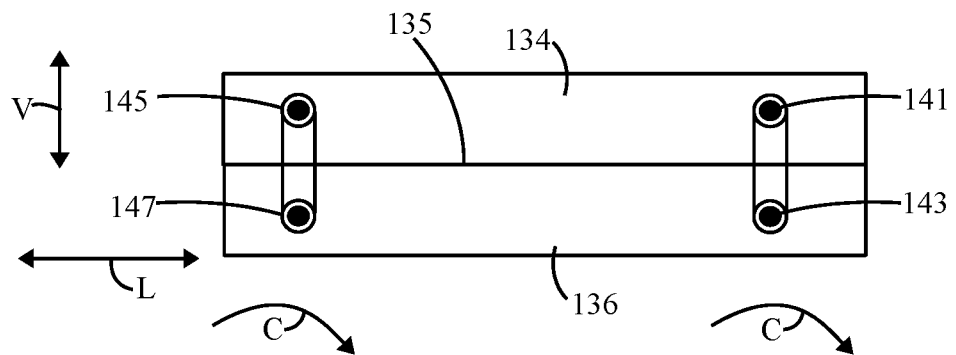
FIG. 1B illustrates side views of the main body unit of the electronic device of FIG. 1A in the active state in accordance with embodiments herein.
Figure 1C:
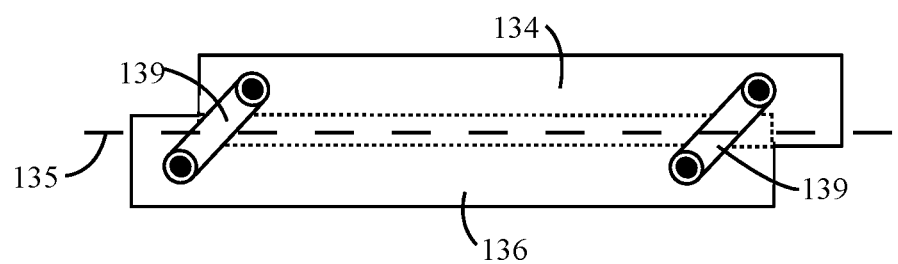
FIG. 1C illustrates side views of the main body unit of the electronic device of FIG. 1A in the storage state in accordance with embodiments herein.

As illustrated in FIGS. 1B and 1C, the upper and lower housings 134, 136 are interconnected to each other by link members 139. In particular, upper and lower pins 141 143 are mounted on each link member 139. The upper pin 141 is slidably received in an aperture 145 formed in the upper housing 134 and the lower pin 141 is slidably received in an aperture 147 formed in the lower housing 136. Link members 139 rotate clockwise (as viewed in FIG. 1B and illustrated by arrow C) and counterclockwise relative to the lower housing 134 about the apertures 145, 147. The upper housing 134 moves or shifts longitudinally in the directions of arrows L and vertically in the direction of arrows V in a linear path relative to the lower housing 134. The rotation of the link member 139 clockwise allows the upper housing 134 to move or shift forward and downward in a linear path relative to the lower housing 136. The rotation of the link member 139 counterclockwise allows the upper housing 134 to move or shift rearward and upward in a linear path relative to the lower housing 136. The electronic device 110 may include a cantilever mechanism 150 (schematically shown in FIG. 1A) or other suitable mechanism that is operably connected to the display unit 114 and upper housing 134 such that rotation of the display unit 114 downwardly towards the main body unit 116 from the open position in turn causes the upper housing 134 to move forward and downward in a linear path relative to the lower housing 136. Rotation of the display unit 114 upwardly away from the main body unit 116 from the closed position in turn causes the upper housing 134 to move rearward and upward in a linear path relative to the lower housing 136. When the display unit 114 is rotated from the open position to the closed position, the upper housing 134 moves forward and downward until the upper housing 134 abuts or is in close proximity to the lower housing 136.

One or more interface components 138, 256, 278, 338, 378 (FIGS. 2A to 3F) may be mounted within the sidewall 130 of the main body unit 116. The interface components 138, 256, 278, 338, 378 are in an operative position when the electronic device 110 is in the operative position (also referred to as an active state). The interface components 138, 256, 278, 338, 378 collapse in a collapsed position, when the electronic device 110 is in the storage position (also referred to as a stored state) to enable the upper housing 134 to move forwardly and downwardly in a linear path relative to the lower housing 136, which will be explained further in more detail.

Figure 2A:
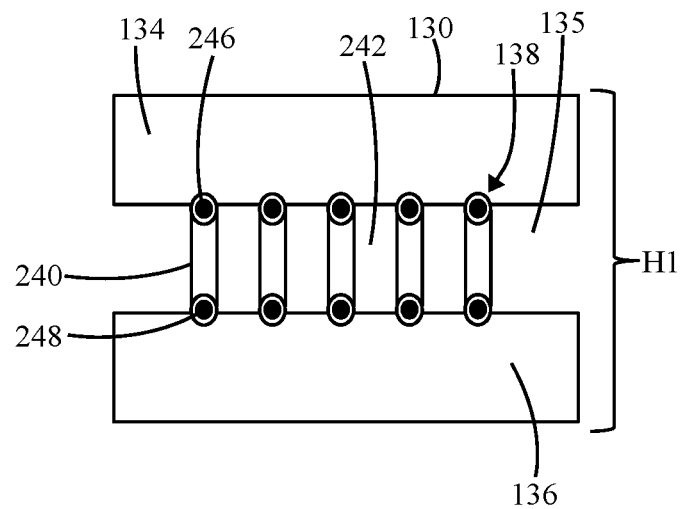
FIG. 2A illustrates a side view of a portion of the main body unit of the electronic device of FIG. 1A with a vent in the operative position in accordance with embodiments herein.
Figure 2B:
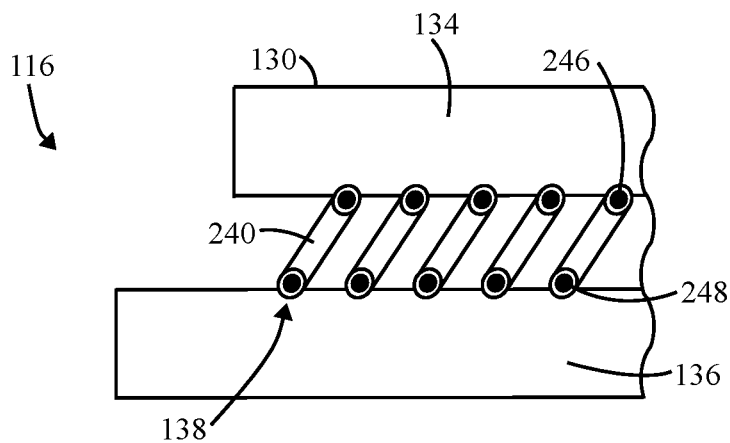
FIG. 2B illustrates a side view of the portion of the main body unit of the electronic device of FIG. 1A with the vent in a transition state between the operative and collapsed positions in accordance with embodiments herein.
Figure 2C:
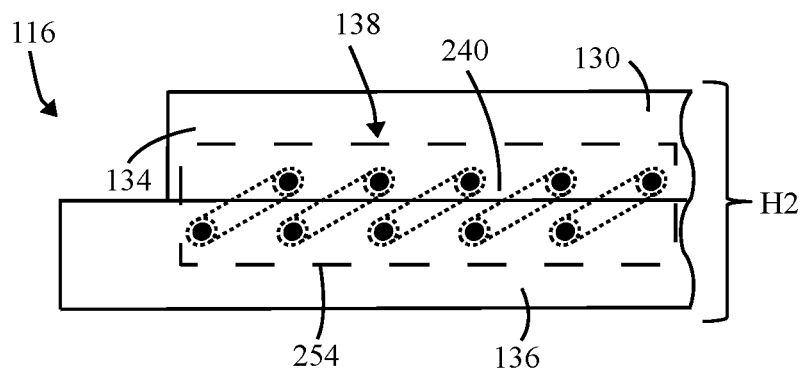
FIG. 2C illustrates a side view of the portion of the main body unit of the electronic device of FIG. 1A with the vent in the collapsed position in accordance with embodiments herein.

By way of example, the interface component may be a vent 138 for cooling the interior of the main body unit 116. FIGS. 2A to 2C show an embodiment for a vent mounted in the sidewall 130 at the left side of the sidewall 130. As illustrated in FIG. 2A, the vent 138 may have a series of louvers or fins 240 that are oriented vertically and spaced apart longitudinally from each other at gaps 242, when in the operative position (active state). Also, when the electronic device 110 is in the operative position (active state), the upper and lower housings 134, 136 are vertically spaced apart from each other at the gap 135 that is approximately the height of the fins 240. The gap 135 corresponds to an interface component retention area. Each fin 240 is pivotally mounted to the upper housing 134 at pivot 246, and pivotally mounted to the lower housing 136 at pivot 248. The pivots 246, 248 may comprise a pin connection, hinge or other suitable pivotal connection that enables pivotal movement of the fins 240 relative to the upper and lower housings 134, 136. In one example, the pivot may be a living hinge (a thin flexible hinge (flexure bearing) made from the same material as the two rigid pieces the hinge connects). In particular, the pivot 246 comprises a living hinge that is integrally formed in one piece with the upper end of the fin 240 and the upper housing 134, and made of the same plastic material as the fin 240 and upper housing 134. The pivot 248 comprises a living hinge that is integrally formed in one piece with the lower end of the fin 240 and the lower housing 136, and made of the same plastic material as the fin 240 and the lower housing 136. In the storage state of the main body 116, the upper and lower housings 134, 136 may define a recess 254 (FIG. 2C) that is configured to receive the fins 240 when the fins 240 are collapsed together.

FIG. 2A illustrates the vent 138 in an operative position and the sidewall 130 at the operative height H1. In the operative position, the vent 138 vents out the hot air inside the electronic unit 110 to cool the electronic unit 110. As the display unit 114 is rotated toward the main body unit 116, the upper housing 134 moves forward and downward relative to the lower housing 136, which in turn causes the fins 240 to pivot forwardly and downwardly as illustrated in FIG. 2B. Continued rotation of the display unit 114 causes the fins 240 to pivot downwardly and forwardly until the fins 240 collapse into the recess 254 (FIG. 2C) of the lower housing 136 and out of view as illustrated in FIG. 2C. In the storage state of the main body unit 116 as illustrated in FIG. 2C, the upper housing 134 abuts the lower housing 136. The sidewall 130 is thus at a storage height H2, which is less than the operative height H1 of the sidewall 130 when the main body unit 116 is in an active state. Hence, the overall height or thickness of the main body unit 116 is reduced when the electronic device 110 is in the storage position, resulting in a thinner electronic device to store or transport.

When the display unit 114 is rotated upwardly and away from the main body unit 116, the upper housing 134 moves rearwardly and upwardly in a linear path relative to the lower housing 136, which in turn causes the fins 240 to pivot rearwardly and upwardly until the fins 240 are vertical, such that the vent 138 is in the operative position.

Figure 2D:
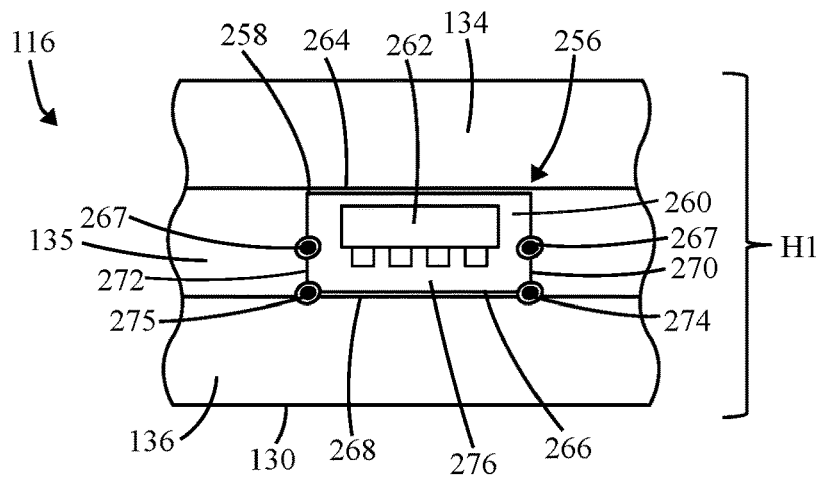
FIG. 2D illustrates a side view of a portion of the main body unit of the electronic device of FIG. 1A with a USB connector port in the operative position in accordance with embodiments herein.
Figure 2E:
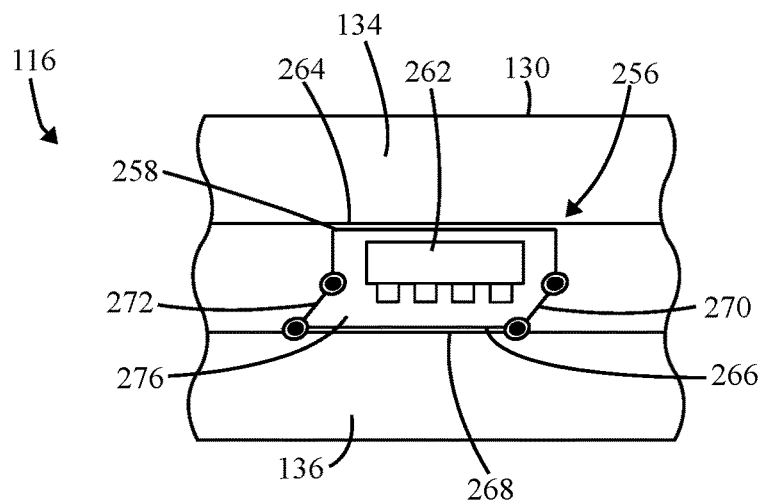
FIG. 2E illustrates a side view of the portion of the main body unit of the electronic device of FIG. 1A with the USB connector port of FIG. 2D in a transition state in accordance with embodiments herein.
Figure 2F:
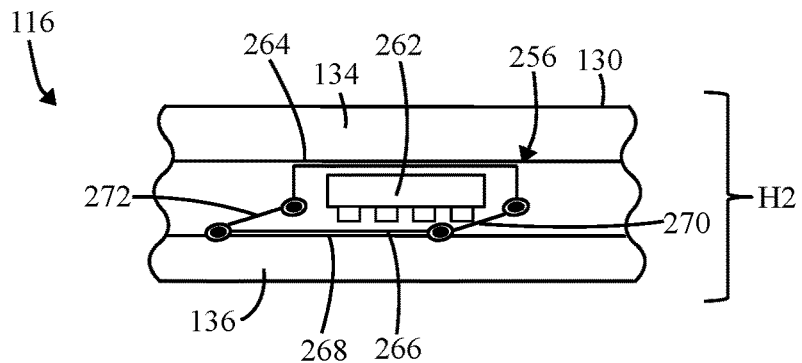
FIG. 2F illustrates a side view of the portion of the main body unit of the electronic device of FIG. 1A with the USB connector port of FIG. 2D in the collapsed position in accordance with embodiments herein.

In addition or alternatively, the interface component may comprise a Universal Bus Connector (USB) connector port 256. FIGS. 2D to 2F illustrate examples with the USB connector port 256 mounted in the sidewall 130 at the left side of the sidewall 130. As illustrated in FIG. 2D, the USB connector port 256 includes a rectangular metal frame 258 that surrounds an interior area 260. An upper rectangular pin connector 262 is positioned inside the interior area 260. The frame 258 includes an inverted U-shaped upper frame portion 264 and a U-shaped lower frame portion 266 that are pivotally connected to each other at pivots 267. The pivots 267 are located at approximately half the height of the gap 135. The lower frame portion 266 includes a bottom member/wall 268 and upstanding front and rear members/walls 270, 272. The bottom wall 268 is pivotally connected to the front and rear walls 270, 272 at pivots 274, 275. The upper frame portion 264 and pin connector 262 are operatively connected with each other and move together relative to the lower frame portion 266. The upper frame portion 264 is connected to the upper housing 134, and the lower frame portion 266 is connected to the lower housing 136. The USB connector port 256 may be of various types such as USB 2.0, USB 3.0, and USB 3.1.

The pivots 267, 274, 275 may comprise a pin connection, hinge or other suitable pivotal connection. In one example, the pivots 267, 274, 275 may be a living hinge (a thin flexible hinge (flexure bearing) made from the same material as the two rigid pieces the hinge connects). In particular, each pivot 267 comprises a living hinge that is integrally formed in one piece with the upper and lower frame portions 264, 266, and made of the same metal material as the upper and lower frame portions 264, 266. The pivot 274 comprises a living hinge that is integrally formed in one piece with the front wall 270 and the bottom wall 268, and made of the same metal material as the front wall 270 and the bottom wall 268. The pivot 275 comprises a living hinge that is integrally formed in one piece with the rear wall 272 and the bottom wall 268, and made of the same metal material as the rear wall 272 and the bottom wall 268.

FIG. 2D illustrates the main body unit 116 in an active state in which the upper and lower frame portions 264, 266 of the USB connector port 256 are vertically aligned with each other in an operative position (e.g., perpendicular to plane of an interface between the upper and lower housing). In the operative position, the USB connector port 256 may be plugged into by a USB plug or otherwise used. As the display unit 114 is rotated towards the main body unit 116, the upper housing 134 moves forward and downward in a linear path relative to the lower housing 136, which in turn causes the front and rear walls 270, 272 to rotate downwardly and forwardly about pivots 274, 275, and the upper frame portion 264 to pivot about the pivots 267 and move, together with the pin connector 262, forwardly and downwardly in a linear path into the gap or space 276 below the pin connector 262 as illustrated in FIG. 2E. Continued rotation of the display unit 114 towards the main body unit 116 causes the upper frame portion 264, front and rear walls 270, 272, and the pin connector 262 to move forwardly and downwardly until the side walls 270, 272 engage the bottom wall 268 of the lower frame portion 266 resulting in a collapsed position illustrated in FIG. 2F.

As a result of the downward movement of the upper housing 134 (enabled by the configuration of the USB connector port 256), the upper housing 134 is positioned closer to the lower housing 136 in the storage state of the main body unit 116 as illustrated in FIG. 2F. In the storage state of the main body unit 116 illustrated in FIG. 2F, the upper housing 134 is in close proximity to the lower housing 136. The sidewall 130 is thus at a storage height H2, which is less than the operative height H1 of the sidewall 130 when the main body unit 116 is at an active state. Hence, the overall height or thickness of the main body unit 116 is reduced when the electronic device 110 is in the storage position, resulting in a thinner electronic device to store or transport.

When the display unit 114 is rotated upwardly and away from the main body unit 116, the upper housing 134 moves upward and rearward in a linear path relative to the lower housing 136, which in turn causes the front and rear walls 270, 272 to pivot upwardly and rearwardly about the pivots 274, 275, and the upper frame portion 264 to move, together with the pin connector 262, rearwardly and upwardly in a linear path out of the gap or space 276 until the main body unit 116 is in an active state in which the upper and lower frame portions 264, 266 are vertically aligned with each other in an operative position as illustrated in FIG. 2D.

Figure 2G:
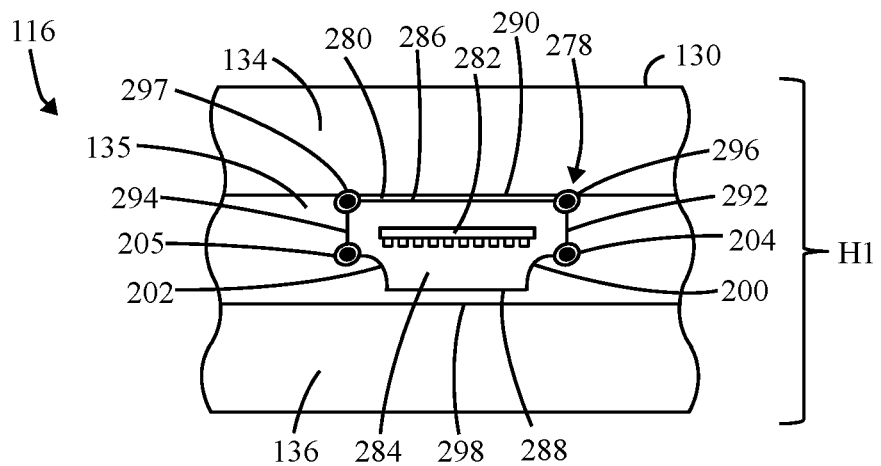
FIG. 2G illustrates a side view of a portion of the main body unit of the electronic device of FIG. 1A with a HDMI connector port in the operative position in accordance with embodiments herein.
Figure 2H:
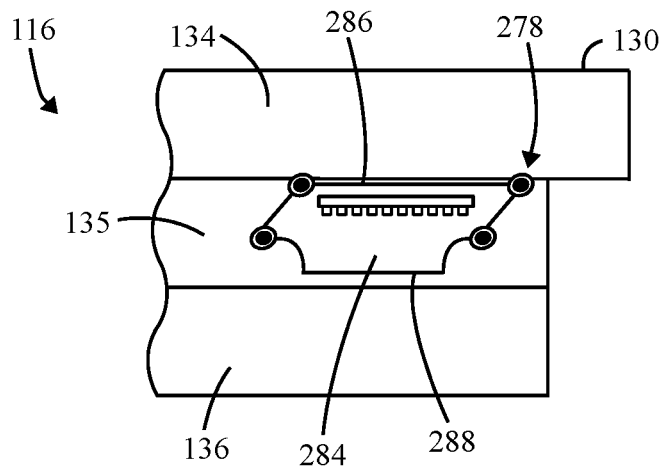
FIG. 2H illustrates a side view of the portion of the main body unit of the electronic device of FIG. 1A with the HDMI connector port of FIG. 2G in a transition state in accordance with embodiments herein.
Figure 2I:
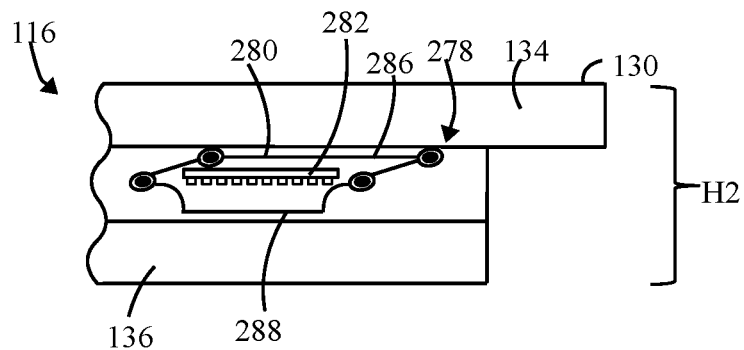
FIG. 2I illustrates a side view of the portion of the main body unit of the electronic device of FIG. 1A with the HDMI connector port of FIG. 2G in the collapsed position in accordance with embodiments herein.

In addition or alternatively, the interface component may comprise a High-Definition Multimedia Interface (HDMI) connector port 278. FIGS. 2G to 2I illustrate the HDMI connector port 278 mounted in the sidewall 130 at the left side of the sidewall 130. As illustrated in FIG. 2G, the HDMI connector port 278 includes a metal frame 280 that surrounds an interior area of the HDMI connector port 278. A pin connector 282 is positioned in the center of the interior area. A peripheral gap 284 surrounds the pin connector 282 and is located radially, relative to the pin connector 282, between the pin connector 282 and the frame 280. The frame 280 includes an upper portion 286 and a lower portion 288. The upper portion 286 has an inverted U-shape and includes a top wall 290 and front and rear walls 292, 294. The front and rear walls 292, 294 depend downwardly from the top wall 290 and are pivotally connected to corresponding ends of the top wall 290 at pivots 296, 297. The lower portion 288 is generally u-shaped and includes a bottom member/wall 298, and front and rear members/walls 200, 202. Each of the front and rear walls 200, 202 are concavely curved and angled upwardly and outwardly from the bottom wall 298. The front and rear walls 200, 202 of the lower portion 288 are pivotally connected to corresponding ends of the front and rear walls 292, 294 of the upper portion 286 at pivots 204, 205. The upper portion 286 is connected to the upper housing 134, and the lower portion 288 is connected to the lower housing 136.

The pivots 296, 297, 204, 205 may comprise a pin connection, hinge or other suitable pivotal connection. In one example, the pivots 296, 297, 204, 205 may be a living hinge (a thin flexible hinge (flexure bearing) made from the same material as the two rigid pieces the hinge connects). In particular, the front pivot 296 comprises a living hinge that is integrally formed in one piece with the top and front walls 290, 292, and made of the same metal material as the top and front walls 290, 292. The rear pivot 297 comprises a living hinge that is integrally formed in one piece with the top and rear walls 290, 294, and made of the same metal material as the top and rear walls 290, 294. The front pivot 204 comprises a living hinge that is integrally formed in one piece with the front walls 292, 200, and made of the same metal material as the front walls 292, 200. The rear pivot 205 comprises a living hinge that is integrally formed in one piece with the rear walls 294, 202, and made of the same metal material as the rear walls 294, 202.

FIG. 2G illustrates the main body unit 116 in an active state in which the upper and lower portions 286, 288 of the HDMI connector port 278 are vertically aligned with each other in an operative position. In the operative position, the HDMI connector port 278 may be plugged into by a HDMI plug or otherwise used. As the display unit 114 is rotated toward the main body unit 116, the upper housing 134 moves forward and downward in a linear path relative to the lower housing 136, which in turn causes the upper portion 286 to pivot forwardly and downwardly about the pivots 296, 297, 204, 205 in a linear path into the peripheral gap 284 as illustrated in FIG. 2H. Continued rotation of the display unit 114 causes the upper portion 286 to pivot forwardly and downwardly in a linear path until the upper portion 286 engages the pin connector 282 and both move further downward until the pin connector 282 engages the lower portion 288, resulting in a collapsed position as illustrated in FIG. 2I. Alternatively, the upper portion 286 may pivot forwardly and downwardly in a linear path until the upper portion 286 engages the pin connector 282, resulting in the collapsed position.

As a result of the downward movement of the upper housing 134 (enabled by the configuration of the HDMI connector port 278), the upper housing 134 is positioned closer to the lower housing 136 in the storage state of the main body unit 116 as illustrated in FIG. 2I. In the storage state of the main body unit 116, the upper housing 134 is in close proximity to the lower housing 136. The sidewall 130 is thus at the storage height H2, which is less than the operative height H1 of the sidewall 130 when the main body unit 116 is at an active state. Hence, the overall height or thickness of the main body unit 116 is reduced, resulting in a more desirable thinner electronic device 110 in the storage position of the electronic device.

When the display unit 114 is rotated upwardly and away from the main body unit 116, the upper housing 134 moves upward and rearward in a linear path relative to the lower housing 136, which in turn causes the upper portion 286 to pivot rearwardly and upwardly about the pivots 296, 297, 204, 205 in a linear path out of the peripheral gap 284 until the main body unit 116 is in the active state in which the upper and lower portions 286, 288 are vertically aligned with each other in an operative position as illustrated in FIG. 2G.

Figure 3A:
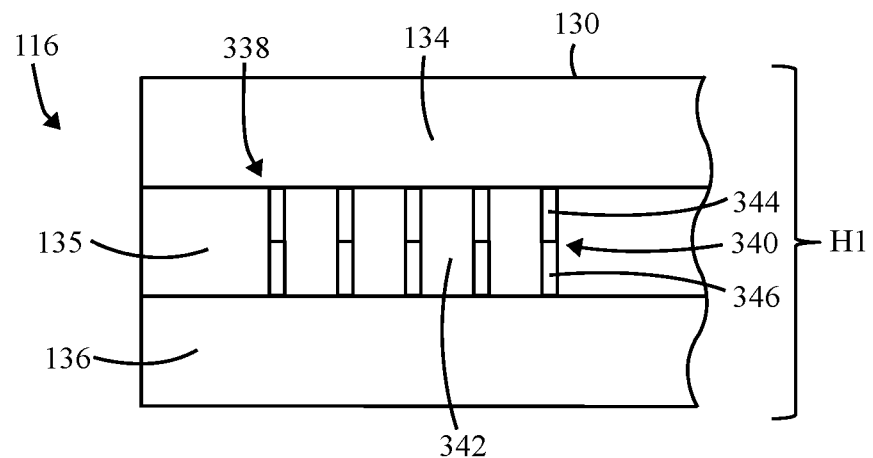
FIG. 3A illustrates a side view of a portion of the main body unit of the electronic device of FIG. 1A with a vent in the operative position in accordance with embodiments herein.

FIGS. 3A to 3F illustrate another embodiment. The embodiment is similar to the embodiment illustrated in FIGS. 1A to 2I except for the different subject matter described below. Elements in the embodiment illustrated in FIGS. 3A to 3F that are similar in structure and function to the embodiment illustrated in FIGS. 1A to 2I will be described with the same reference numbers. In the embodiment, the interface component may comprise a vent 338 for cooling the interior of the main body unit 116. The vent 338 may have a series of fins 340 that are oriented vertically, and longitudinally spaced apart by gaps 342 from each other when in an operative position as illustrated in FIG. 3A. Each fin 340 includes an upper member/piece 344 and a lower member/piece 346 that are vertically aligned together and mate or engage each other in the operative position as illustrated in FIG. 3A. The upper piece 344 and a lower piece 346 are of equal height. The upper and lower pieces 344, 346 are movable in a longitudinal and vertical direction in a linear path relative to each other. The upper piece 344 is connected to the upper housing 134, and the lower piece 346 is connected to the lower housing 136. Also, when the electronic device 110 is in the operative position, the upper and lower housings 134, 136 are vertically spaced apart from each other at approximately the height of the fins 340.

Figure 3B:
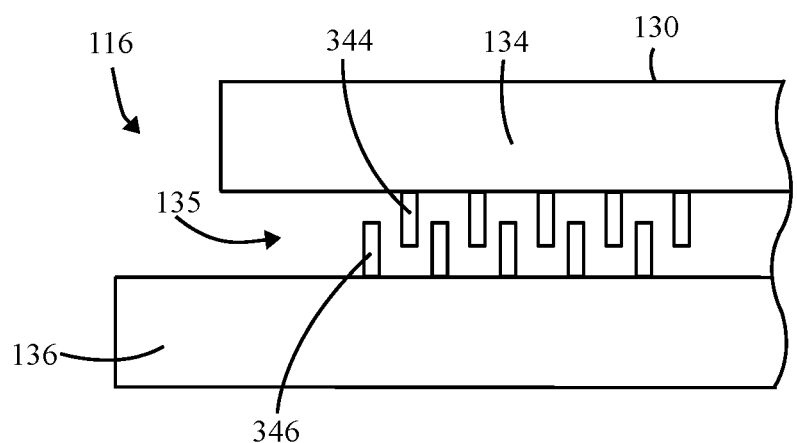
FIG. 3B illustrates a side view of the portion of the main body unit of the electronic device of FIG. 1A with the vent of FIG. 3A in a transition state in accordance with embodiments herein.
Figure 3C:
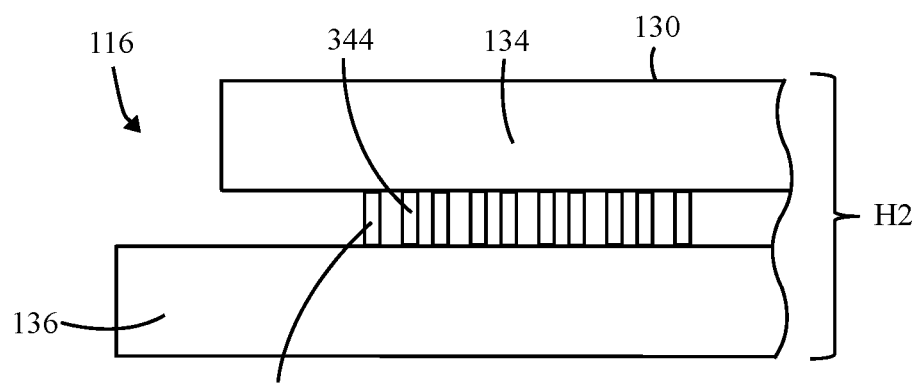
FIG. 3C illustrates a side view of the portion of the main body unit of the electronic device of FIG. 1A with the vent of FIG. 3A in the collapsed position in accordance with embodiments herein.

FIG. 3A illustrates the vent 338 in an operative position in the embodiment. As the display unit 114 is rotated toward the main body unit 116, the upper housing 134 slidably moves forward and downward in a linear path relative to the lower housing 136, which in turn causes the upper piece 344 of each fin 340 to move forward and then downward into the corresponding gap 342 such that the upper piece 344 separates from the lower piece and is located beyond the corresponding lower piece 346 as illustrated in FIG. 3B. Continued rotation of the display unit 114 causes the upper piece 344 to move downward into the gap 342 until the upper piece 344 engages the lower housing 136 and the lower piece 346 engages the upper housing 134, resulting in a collapsed position as illustrated in FIG. 3C. In the collapsed position, the upper 344 and lower pieces 346 are interleaved together. The gap 342 may have a longitudinal distance that is sufficient to enable the upper piece 344 to move forwardly before the upper piece 344 engages the lower housing 136. Alternatively, in the collapsed position, the upper and lower pieces 344, 346 may be in close proximity to the lower and upper housings 136, 134, respectively, if the gap is not at such a sufficient distance or for other design constraints.

When the display unit 114 is rotated upwardly and away from the main body unit 116, the upper housing 134 slidably moves upward and rearward in a linear path relative to the lower housing 136, which in turn causes the upper piece 344 of each fin 340 to move upwardly and rearwardly in a linear path out of the corresponding gap 342 until the upper piece 344 and the lower piece 346 are vertically aligned together and mate or engage each other in the operative position as illustrated in FIG. 3A.

Figure 3D:
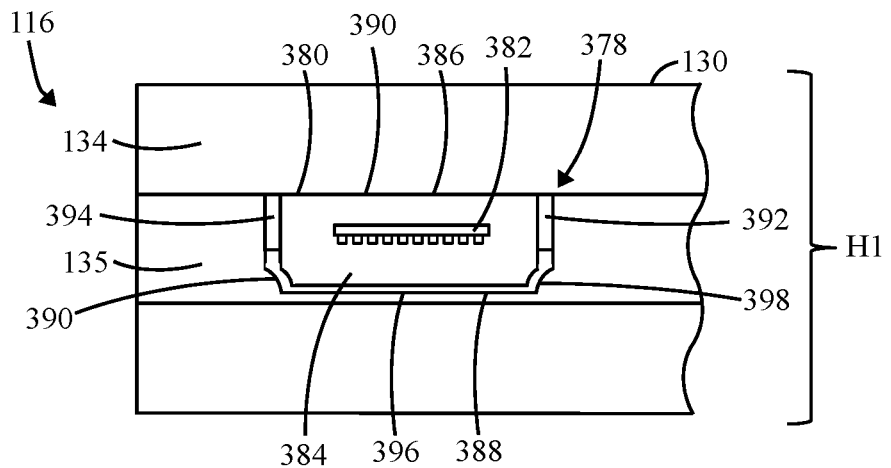
FIG. 3D illustrates a side view of a portion of the main body unit of the electronic device of FIG. 1A with a HDMI connector port in the active state of the main body unit in accordance with embodiments herein.

The embodiment may also include another interface component. The interface component may comprise a HDMI connector port 378. As illustrated in FIG. 3D, the HDMI connector port 378 includes a metal frame 380 that surrounds an interior area of the HDMI connector port 378. A rectangular pin connector 382 is position in the center of the interior area. A peripheral gap 384 surrounds the pin connector 382 and is located radially, relative to the pin connector 382, between the pin connector 382 and the frame 380. The frame 380 includes an upper shell 386 and a lower shell 388 that are aligned together and mate or engage each other at the midway point of the height of the frame 380 in the active state of the main body unit 116. The upper and lower shells 386, 388 are movable vertically and longitudinally in a linear path relative to each other. The upper shell 386 has an inverted u-shape and includes a top member/wall 390 and vertical front and rear members/walls 392, 394. The front and rear walls 392, 394 depend downwardly from the top wall 390. The lower shell 388 is generally u-shaped and includes a bottom wall 396, and concavely curved front and rear walls 398, 399 that angle upwardly and outwardly.

When the main body unit 116 is in the active state, the HDMI connector port 378 is in an operative position as illustrated in FIG. 3D. In the operative position, the free ends 302, 304 (FIG. 3E) of the front walls 392, 398 of the upper and lower shells 386, 388 are vertically aligned with each other and mate or engage each other, and the free ends 306, 308 (FIG. 3E) of the rear walls 394, 399 of the upper and lower shells 386, 388 are vertically aligned with each other and mate or engage each other. The upper shell 386 is connected to the upper housing 134, and the lower shell 388 is connected to the lower housing 136. The HDMI connector ports may be of various types such as HDMI 1.1, HDMI 1.2 HDMI 1.3, HDMI 1.4, or HDMI 2.0.

Figure 3E:
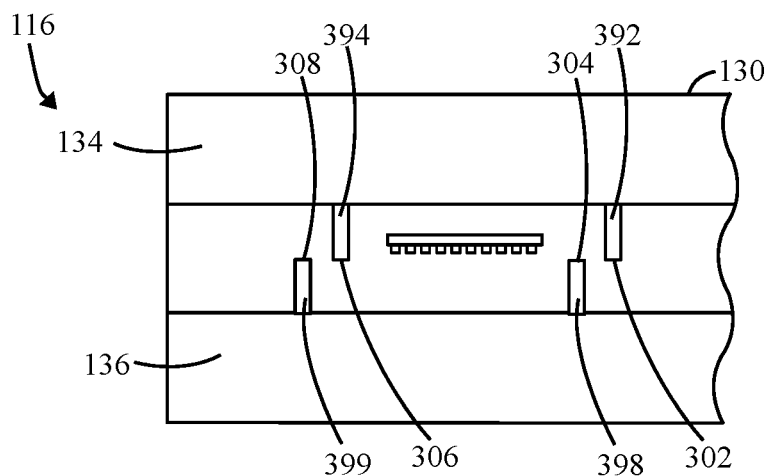
FIG. 3E illustrates a side view of the portion of the main body unit of the electronic device of FIG. 1A with the HDMI connector port of FIG. 3D in a state between the active and storage states of the main body unit in accordance with embodiments herein
Figure 3F:
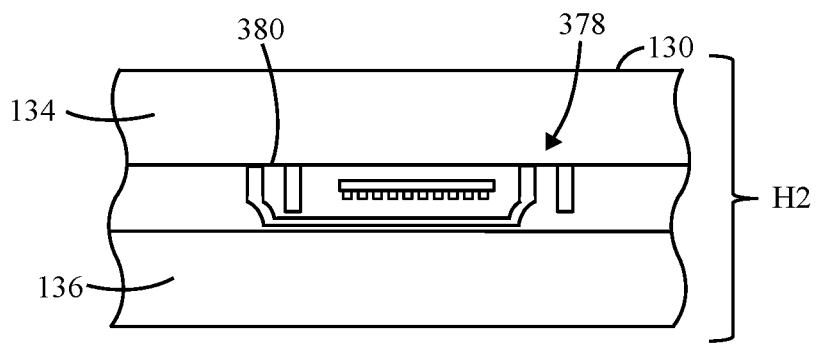
FIG. 3F illustrates a side view of the portion of the main body unit of the electronic device of FIG. 1A with the HDMI connector port of FIG. 3D in the storage state of the main body unit in accordance with embodiments herein.

In the operative position, the HDMI connector port 378 may be plugged into by a HDMI plug or otherwise used. As the display unit 114 is rotated toward the main body unit 116, the upper housing 134 slidably moves forward and downward in a linear path relative to the lower housing 136, which in turn causes the upper shell 386 to move forward and then downward in a linear path into the peripheral gap 384 such that the front and rear walls 392, 394 are located forwardly beyond or offset from their corresponding front and rear walls 398, 399 of the lower shell 388 as illustrated in FIG. 3E. Continued rotation of the display unit 114 causes the upper shell 386 to move downwardly and forwardly in a linear path until the upper shell 386 engages the pin connector 382, and then the upper shell 386 and pin connector 382 together move downwardly into the lower part of the peripheral gap 384 until the upper shell 386 engage the lower shell 388 resulting in a collapsed position as illustrated in FIG. 3F. In the collapsed position, the front and rear walls 398, 399 of the lower shell 388 are interleaved with the front and rear walls 392, 394 of the upper shell 386.

As a result of the downward movement of the upper housing 134 (enabled by the configuration of the HDMI connector port 378), the upper housing 134 is positioned closer to the lower housing 136 in the storage state of the main body unit 116 as illustrated in FIG. 3F. The sidewall 130 is thus at the storage height H2, which is less than the operative height H1 of the sidewall 130 when the main body unit 116 is at an active state. Hence, the overall height or thickness of the main body unit 116 is reduced when the electronic device is in the storage position, resulting in a thinner electronic device to store or transport.

When the display unit 114 is rotated upwardly away from the main body unit 116, the upper housing 134 moves rearwardly and upwardly in a linear path relative to the lower housing 136, which in turn causes the upper shell 386 to move rearward and upward in a linear path out of the peripheral gap 384 until free ends 306, 308 (FIG. 3E) of the rear walls 394, 399 of the upper and lower shells 386, 388 are vertically aligned with each other and mate or engage each other in the active state of the main body unit 116 as illustrated in FIG. 3D.

Figure 4A:
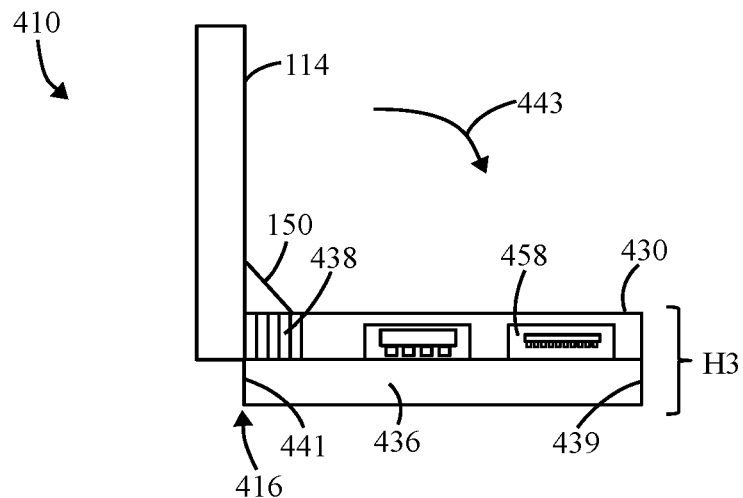
FIG. 4A illustrates a side view of an electronic device in the operative position according to another embodiment in accordance with embodiments herein.
Figure 4B:
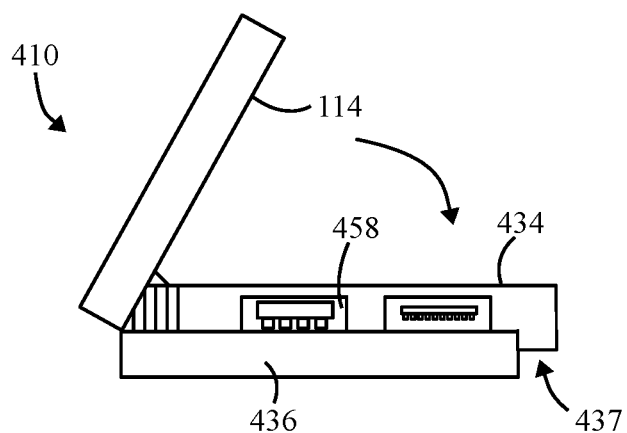
FIG. 4B illustrates a side view of the electronic device of FIG. 4A in a position between the operative and storage positions in accordance with embodiments herein.
Figure 4C:
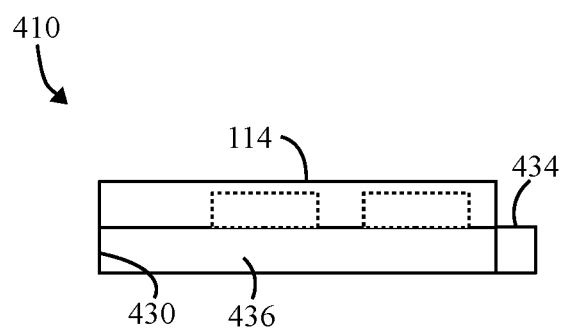
FIG. 4C illustrates a side view of the electronic device of FIG. 4A in the storage position in accordance with embodiments herein.

FIGS. 4A to 4C illustrate side views of various positions of an electronic device 410 according to another embodiment. The embodiment is similar to the embodiment illustrated in FIGS. 1A to 2I except for the different subject matter described below. Elements in the embodiment illustrated in FIGS. 4A to 4C that are similar in structure and function to the embodiment illustrated in FIGS. 1A to 2I will be described with the same reference numbers. In the embodiment, the electronic device 410 is a laptop PC having a display unit 114 and a main body unit 416 in which the display unit 114 is rotatably mounted to the main body unit 416. However, the electronic device 410 may also be a cellular phone, a smart phone, note pad, and various electronic organizers as long as the display unit can be rotated ninety degrees or more relative to the main body unit 416.

The display unit 114 is rotatably mounted to the main body unit 416 by the use of the hinge 112 (FIG. 1A) to enable the display unit 114 to rotate from zero to three hundred sixty degrees relative to the main body unit 416. However, other ways to rotatably mount the display unit 114 to the main body unit 416 may be used instead of the hinge 112. The electronic device 410 is in an operative position for use when the display unit 114 is angled at a position approximately ninety degrees or beyond relative to the main body unit 416 (FIG. 4A). The electronic device 410 is in a storage position when the display unit 114 and the main body unit 416 face each other at an angle of zero degrees relative to each other.

The main body unit 416 houses the keyboard 120, processor, memory as well as other components based on the nature and functionality to be provided. For descriptive convenience, it is assumed that the display unit 114 is completely closed to the main body unit 416 at a 0-degree angle position between the main body unit 116 and the display unit 114 by hinges 112, where the display 118 and the keyboard 120 face each other.

The main body unit 416 includes upper and lower housings 434 and 436 that together are formed into the shape of a flat box and contains various electronic components, not shown, such as a substrate, an arithmetic unit, a processor and a memory that are housed therein.

The main body unit 416 includes an upstanding sidewall 430. The sidewall 430 is defined by the upper and lower housings 434, 436. The upper and lower housings 434, 436 are slidably mounted to each other and slide longitudinally and vertically in a linear path relative to each other. The keyboard 120 is mounted within the upper housing 134. The sidewall 430 extends around the periphery of the main body unit 416.

In the embodiment, the upper housing 434 has a perimeter that is less than that of the lower housing 436 to enable the upper housing 434 to nest inside the lower housing 436. The lower housing 436 and upper housing 434 may be friction fitted to each other. The lower housing includes upstanding front and rear walls 439, 441. Several interface components 438, 458 may be mounted within the sidewall 430 of the main body unit 416. The interface component 338 may comprise a vent and the interface components 458 may comprises USB connector ports. Alternatively or in addition, the interface components may comprise HDMI connector ports, display ports, Ethernet ports, audio ports, or any other suitable interface components. In the embodiment, the interface components are located within the upper housing 434 of sidewall 430. When the electronic device 410 is in the operative position, the main body unit 416 and the interface components 438, 458 are in an active state. When the electronic device 410 is in the storage position, the main body unit 416 and interface components 438, 458 are in a storage state.

The electronic device 410 includes the cantilever mechanism 150 (schematically illustrated in FIG. 4A) or other suitable mechanism that is operably connected to the display unit 114 and upper housing 434 such that rotation of the display unit 114 downwardly towards the main body unit 416 from the operative position of the electronic unit 410, as illustrated by arrow 443, in turn causes the upper housing 434 to move forward and downward relative to the lower housing 436, and rotation of the display unit 114 upward and away from the main body unit 416 causes the upper housing 434 to move rearwardly and upwardly in a linear path relative to the lower housing 436. The upper housing 434 may include a slot 437 (FIG. 4B) that receives a front wall 439 of the lower housing 436 to enable the upper housing 434 to move downward into the interior space surrounded by the lower housing 436.

When the electronic device 410 is in the operative position, the upper housing 434 is positioned above the lower housing 436 such that the interface components 438, 458 are exposed for use. In the operative position, the upper housing 434 is position on top of the front and rear walls 439, 441 of the lower housing 436 and supported vertically by the front and rear walls 439, 441. As the display unit 114 is rotated downward and toward the main body unit 416 as depicted by arrow 443, the display unit 114 causes the upper housing 434 to slidably move forward and downward in a linear path into the interior area of the lower housing 436 as illustrated in FIG. 4B. Continued rotation of the display unit 114 downward and toward the main body unit 416 causes the upper housing 434 to slidably move forward and downward into the interior area until the interface components 438, 458 are out of view resulting in a collapsed position as illustrated in FIG. 4C. The sidewall 430 is thus at a storage height H4 (FIG. 4C), which is less than an operative height H3 (FIG. 4A) when the main body unit 416 is at an active state. Hence, the overall height or thickness of the main body unit 416 is reduced when the electronic device 410 is in the storage position, resulting in a more desirable thinner electronic device 410 to store or transport. Also, with the interface components 438, 458 being covered by the lower housing 436, the interface components 438, 458 are protected from dirt, water or other outside objects. In an alternative arrangement, the lower housing may have a perimeter that is less than that of the upper housing to enable the lower housing to nest inside the interior area of the upper housing. In the arrangement, the interfaces are located within the lower housing of side wall such that rotation of the display unit 114 causes the upper housing to slidably move forward and downward in a linear path over the lower housing, thereby covering the lower housing such that the interface components are out of view.

Figure 5:
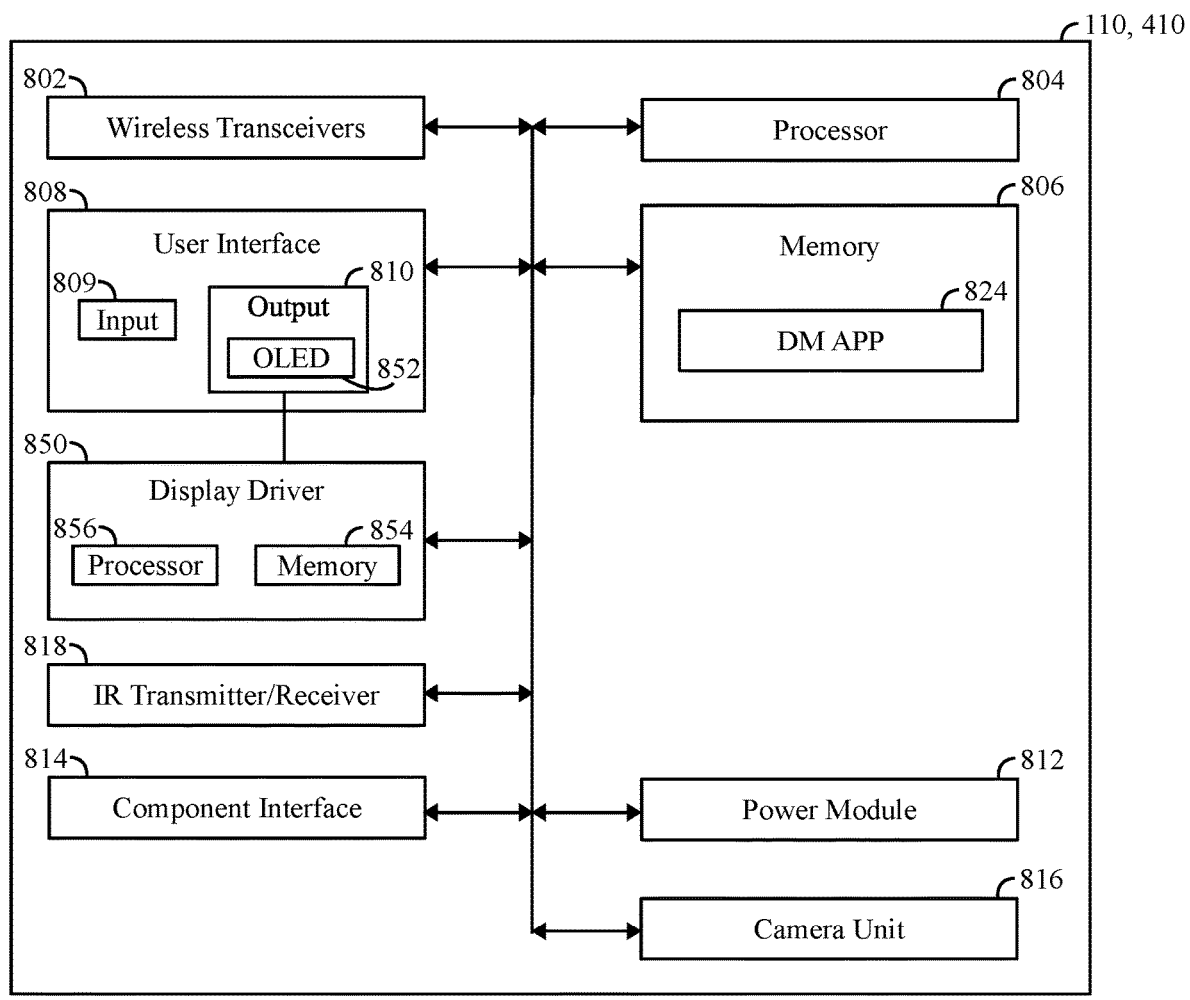
FIG. 5 illustrates a simplified block diagram of internal components of the electronic device configured to manage content display to different regions of a flexible display in accordance with embodiments herein.

FIG. 5 illustrates a simplified block diagram of internal components of the electronic device 110 or 410 configured to manage content display to different regions of a flexible display in accordance with embodiments herein. The device 110 or 410 includes components such as one or more wireless transceivers 802, one or more processors 804 (e.g., a microprocessor, microcomputer, application-specific integrated circuit, etc.), one or more local storage medium (also referred to as a memory) 806, a user interface 808 which includes one or more input devices 809 and one or more output devices 810, a power module 812, a component interface 814 and a camera unit 816. All of these components can be operatively coupled to one another, and can be in communication with one another, by way of one or more internal communication links, such as an internal bus. The camera unit 816 may capture one or more frames of image data.

The input and output devices 809, 810 may each include a variety of visual, audio, and/or mechanical devices. For example, the input devices 809 can include a visual input device such as an optical sensor or camera, an audio input device such as a microphone, and a mechanical input device such as the keyboard 120, keypad, selection hard and/or soft buttons, switch, touchpad, touch screen, icons on a touch screen, a touch sensitive areas on a touch sensitive screen and/or any combination thereof. Similarly, the output devices 810 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 810 may include a touch sensitive screen, a non-touch sensitive screen, a text-only display, a smart phone display, an audio output (e.g., a speaker or headphone jack), and/or any combination thereof. Optionally, the input devices 809 may include one or more touch sensitive layers provided on the front and/or rear sides of the display 852. The output devices 810 include a flexible display layer, such as an OLED display 852.

The transceiver 802 can utilize a known wireless technology for communication. Exemplary operation of the wireless transceivers 802 in conjunction with other components of the device 110 or 410 may take a variety of forms and may include, for example, operation in which, upon reception of wireless signals, the components of device 110 or 410 detect communication signals from secondary devices and the transceiver 802 demodulates the communication signals to recover incoming information, such as responses to inquiry requests, voice and/or data, transmitted by the wireless signals. The processor 804 formats outgoing information and conveys the outgoing information to one or more of the wireless transceivers 802 for modulation to communication signals. The wireless transceiver(s) 802 convey the modulated signals to a remote device, such as a cell tower or a remote server (not shown).

The local storage medium 806 can encompass one or more memory devices of any of a variety of forms (e.g., read only memory, random access memory, static random access memory, dynamic random access memory, etc.) and can be used by the processor 804 to store and retrieve data. The data that is stored by the memory 806 can include, but need not be limited to, operating systems, applications, user collected content and informational data. Each operating system includes executable code that controls basic functions of the device, such as interaction among the various components, communication with external devices via the wireless transceivers 802 and/or the component interface 814, and storage and retrieval of applications and data to and from the memory 806. Each application includes executable code that utilizes an operating system to provide more specific functionality for the communication devices, such as file system service and handling of protected and unprotected data stored in the local storage medium 806.

A display management (DM) application 824 is stored in the memory 806. The DM application 824 includes program instructions accessible by the one or more processors 804 to direct a processor 804 to implement the methods, processes and operations described herein including, but not limited to the methods, processes and operations illustrated in the FIGS. and described in connection with the FIGS. The DM application 824 manages operation of the processor 804, display driver 850 and/or a video card in connection with displaying desired content on the primary and secondary (e.g., edge and/or rear) viewing regions of the flexible display layer.

In accordance with at least one embodiment, a touch sensitive layer is located over the secondary viewing region of the display layer on the back surface of the display unit. The DM application 824 directs the processor to switch to a desired mode. In accordance with at least one embodiment, the processor utilizes the secondary viewing region of the display layer to display one or more of alert content, calendar content, message content, advertisement content, or personalized content.

Other applications stored in the memory 806 include various application program interfaces (APIs), some of which provide links to/from the cloud hosting service. The power module 812 preferably includes a power supply, such as a battery, for providing power to the other components while enabling the device 110 or 410 to be portable, as well as circuitry providing for the battery to be recharged. The component interface 814 provides a direct connection to other devices, auxiliary components, or accessories for additional or enhanced functionality, and in particular, can include a USB port for linking to a user device with a USB cable.

Optionally, the device 110 or 410 may include an infrared (IR) transmitter/receiver 818 that may be utilized in connection with controlling one or more secondary devices through transmission and reception of IR signals.

A display driver 850 is coupled to the processor 804 and configured to manage display of content on a display 852. The display driver 850 is connect to the primary and secondary viewing regions of the OLED display 852. The display driver 850 writes the desired content to the primary and secondary viewing regions under direction of the main processor 804. Optionally, the display driver 850 includes display memory 854 and one or more display control processors 856. The display memory 854 includes multiple sections, to which the display control processors 856 and/or processor 804 write content to be displayed. The sections of the display memory 854 are mapped to corresponding regions of the flexible display layer. An example of one mapping configuration is discussed herein in connection with FIG. 7. The display driver 850 provides a common display interface for all of the viewing regions within the flexible display layer within the display 852. For example, the display driver 850 manages display of content in the primary and secondary viewing regions.

Optionally, the display driver 850 may omit a separate processor and memory, and alternatively or additionally, utilize sections of the memory 806 as display memory and the processor 804 to manage writing content to a display memory section within the memory 806.

In the foregoing embodiments, the upper and lower housings are illustrated to be moved relative to one another in a longitudinal direction between the front and rear of the main base unit. Additionally or alternatively, the upper and lower housings may be constructed to move in other directions relative to one another. For example, the upper housing may move in the lateral direction (e.g. from right to left or from left to right) relative to the lower housing. Additionally or alternatively, the upper housing may move in the rearward direction relative to the lower housing such that the upper housing moves rearward toward the display unit while moving downwardly and collapsing into the lower housing. Also, a locking device may be included that automatically or manually locks the upper and lower housings together to prevent them from moving when electronic device is in the operative position. The locking device would be unlocked automatically or manually when the display unit begins moving to the closed position.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

This written description uses examples to disclose several embodiments of the subject matter and also to enable a person of ordinary skill in the art to practice the embodiments of the subject matter, including making and using any devices or systems and performing any incorporated methods. The patentable scope of the subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An electronic device comprising:
a display unit;
memory storing program instructions;
a processor to execute the program instructions in connection with operating the electronic device;
a main body unit housing the memory and processor, the display unit rotatably mounted to the main body unit, the main body unit having a sidewall divided into first and second sidewall segments that are moved relative to one another in a vertical plane in connection with the main body unit being shifted between active and storage states; and
an interface component mounted within the sidewall of the main body unit, the interface component including members that define a frame divided into first and second shells mounted within the first and second sidewall segments, respectively, the first and second shells mating with one another and aligned with one another within the vertical plane when the interface component is in the operative position, the first shell having walls movable to an offset position fitted between walls of the second shell when the interface component is in the collapsed position corresponding to the storage state.

2. The electronic device of claim 1, wherein the interface component represents an electrical connector port and the members represent the walls that define the frame of the connector port, the frame divided into the first and second shells that mate with one another, the first shell being offset to fit between the walls of the second shell and remaining at least partially within the vertical plane when the interface component is in the collapsed position.

3. The electronic device of claim 1, wherein the walls of the first and second shells are movable relative to one another between aligned and interleaved arrangements.

4. The electronic device of claim 1, wherein the first and second shells join to have a first height when in an operative shape corresponding to the operative position, the first and second shells having a second height when in a collapsed shape corresponding the collapsed position, wherein the second height is less than the first height.

5. The electronic device of claim 1, wherein the interface component represents a ventilation component and the members further comprise fins within the ventilation component, the fins spaced apart by gaps and aligned at a first orientation in the vertical plane in connection with the interface component in the operative position, the fins collapsing into the gaps, remaining in the vertical plane and aligned in a second orientation in connection with the interface component in the collapsed position.

6. The electronic device of claim 5, wherein the fins rotate between the first and second orientations.

7. The electronic device of claim 1, wherein the first and second sidewall segments are movable relative to one another along the vertical plane between first and second heights in connection with the main body unit being movable between the active and storage states, and wherein the walls are moveable relative to one another along the vertical plane to change a shape of the interface component as the sidewall moves between the first and second heights.

8. The electronic device of claim 1, wherein the interface component represents an electrical connector port and the first and second shells that are pivotally connected to each other and surround a gap that includes a pin connector, wherein the walls on the first shell align with the corresponding walls on the second shell in a first orientation in connection with the operative position, the first and second shells collapsing into the gap in a second orientation in connection with the collapsed position.

9. The electronic device of claim 8, wherein the first and second shells pivot between the first and second orientations.

10. The electronic device of claim 1 wherein the interface component has a predetermined standard form factor envelop in the operative position, and the interface component collapses into a gap within the envelop when in the collapsed position.

11. An electronic device comprising:
a display unit;
a main body unit, the display unit rotatably mounted to the main body unit, the main body unit having a sidewall divided into first and second sidewall segments that are movable relative to one another corresponding to the main body unit being movable between active and storage states; and
an interface component including first and second portions representing first and second shells mounted within the first and second sidewall segments, respectively, of the main body unit, wherein the first and second sidewall segments move upward and downward in a linear path in a vertical plane relative to one another such that the sidewall and interface component shift between first and second heights corresponding to the main body unit being movable between the active and storage states, wherein the first and second shells mating with one another and aligned with one another within the vertical plane when the interface component is in the active state, the first shell having walls movable to an offset position fitted between walls of the second shell when the interface component is in the storage state.

12. The electronic device of claim 11, wherein the first sidewall segment is nested inside the second sidewall segment when the main body unit is in the storage state.

13. The electronic device of claim 11, wherein the interface component represents an electrical connector divided into the first and second shells.

14. The electronic device of claim 11, wherein the interface component represents a ventilation component, wherein the ventilation component includes fins, wherein the fins are spaced apart by gaps in a first orientation in connection with the main body unit being in the active state, the fins collapsing into the gaps in a second orientation in connection with the main body unit being in the storage state, wherein the fins rotate between the first and second orientations.

15. The electronic device of claim 11, wherein the interface component represents an electrical connector divided into the first and second shells that are pivotally connected to each other and surround a gap, wherein the members on the first shell align with corresponding members on the second shell in a first orientation corresponding to the connector being in the active state, the first and second shells collapsing into the gap in a second orientation corresponding to the connector being in the storage state.

16. A method comprising:
providing an electronic device with a display unit rotatably mounted to a main body unit;
positioning the display unit and the main body unit in an operative position, the display unit rotatable from the operative position toward the main body unit to a storage position of the electronic device;
providing a first segment of a sidewall of the main body unit to be movable upward and downward in a linear path along a vertical plane relative to a second segment of the sidewall of the main body unit to reduce the height of the main body unit; and
providing spaced apart members of an interface component mounted within the sidewall to be movable relative to one another along the vertical plane to allow the first and second segments of the sidewall of the main body unit to move relative to each other to reduce the height of the main body unit.

17. The method of claim 16, wherein the first segment is movable forward or rearward and is moveable downward in linear paths, relative to the second segment, to a position inside of the second segment.

18. The method of claim 16, further comprising providing an interface component in the sidewall, wherein the interface component represents an electrical connector divided into first and second shells that are pivotally connected to each other and surround a gap, wherein positioning the display unit and the main body unit in an operative position includes aligning members on the first shell with corresponding members on the second shell, wherein moving the first segment relative to the second segment includes pivoting the first shell relative to the second shell such that the first and second shells collapse into the gap to reduce the height of the main body unit.

19. The method of claim 16, further comprising providing an interface component in the sidewall, wherein the interface component represents a connector divided into first and second shells that mate with one another and surround a gap, wherein positioning the display unit and the main body unit in an operative position for use includes aligning members on the first shell with corresponding members on the second shell, wherein moving the first segment relative to the second segment includes moving the first shell to an offset position relative to the second shell such that the a member of the first shell fits into the gap to reduce the height of the main body unit.

* * * * *